US011328191B2

(12) United States Patent
Skoglund et al.

(10) Patent No.: US 11,328,191 B2
(45) Date of Patent: May 10, 2022

(54) E-CARD ENCODER MODULE

(71) Applicant: ASSA ABLOY AB, Stockholm (SE)

(72) Inventors: John P. Skoglund, Prior Lake, MN (US); Brent Lien, Minneapolis, MN (US)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 16/888,971

(22) Filed: Jun. 1, 2020

(65) Prior Publication Data

US 2021/0374493 A1  Dec. 2, 2021

(51) Int. Cl.
*G06K 19/077* (2006.01)
*G06K 17/00* (2006.01)
*G06K 1/12* (2006.01)
*G06K 19/06* (2006.01)

(52) U.S. Cl.
CPC ......... *G06K 17/0003* (2013.01); *G06K 1/125* (2013.01); *G06K 1/128* (2013.01); *G06K 19/06046* (2013.01)

(58) Field of Classification Search
CPC ....... G06K 19/07716; G06K 19/07718; G06K 19/07745; G06K 19/07749; G06Q 20/105; B42D 25/00; B42D 25/40; B42D 25/48; B42D 25/485
See application file for complete search history.

(56) References Cited

U.S. PATENT DOCUMENTS

| | | | | |
|---|---|---|---|---|
| 6,315,283 B1* | 11/2001 | Haas | ...................... | B65H 3/063 271/10.09 |
| 6,394,346 B1* | 5/2002 | Bonneau, Jr. | .......... | G01R 31/01 235/438 |
| 6,508,399 B2* | 1/2003 | Sasaki | ................ | G06K 17/0025 235/381 |
| 6,543,685 B1* | 4/2003 | Lien | ....................... | G06K 1/125 235/380 |
| 2009/0097955 A1* | 4/2009 | Francis | .................... | B41J 13/12 414/787 |
| 2018/0357622 A1* | 12/2018 | Mosteller | ............ | H01L 21/6835 |
| 2020/0247633 A1* | 8/2020 | Hoffman | .............. | B23K 26/362 |

* cited by examiner

*Primary Examiner* — Thien M Le
*Assistant Examiner* — April A Taylor
(74) *Attorney, Agent, or Firm* — Schwegman Lundberg & Woessner, P.A.

(57) ABSTRACT

A card encoding system comprises a belt to receive an encodable card on a first surface of the belt; a contactless encoding module including an encoding antenna, wherein the encoding antenna is positioned opposite a second surface of the belt; and a belt drive controller configured to rotate a drive roller to move the belt to position the encodable card for encoding using the encoding antenna.

17 Claims, 5 Drawing Sheets

E-CARD ENCODER MODULE

TECHNICAL FIELD

Embodiments illustrated and described herein generally relate to encoders for electronic cards, also called e-cards of smart cards.

BACKGROUND

E-card encoders encode information onto e-cards. E-cards are also referred to as smart cards or chip cards. The e-cards are the size of a credit card and may include an integrated circuit to store the information. The integrated circuit may include a microprocessor and memory. The e-card may include a radio frequency (RF) antenna to receive the information from the encoding device, or the e-card may include conductive (e.g., metal) contacts to serve as input-output (I/O) ports to receive the information. Some e-cards can also include a magnetic stripe to store information.

Encoding e-cards with an RF antenna can be referred to as contactless encoding. Encoding e-cards using pins to physically contact the e-cards can be referred to as contact encoding. Both contactless and contact encoding can involve challenges. For contactless encoding, it can be difficult to optimally position the antenna of the encoder relative to the antenna of the e-card. In contact encoding, the pins of the encoder are susceptible to wear from friction.

DETAILED DESCRIPTION

E-card encoders can encode e-cards using contactless or contact encoding. The un-encoded e-cards can be automatically fed into the e-card encoder and encoded using an encoding module. A challenge in contactless encoding is reliable positioning between the antenna of the encoder and the antenna of the e-card automatically fed into the controller. It is desirable to get the RF antenna of the encoder as close as possible to the e-card with little or no obstructions in the way; especially metal obstructions that can interfere with the RF signals. The antenna of the encoder is typically similar in size to the size of the e-card. For reliable encoding, the ideal position of the encoder antenna is centered on and very close to the e-card. Even a separation of ½ inch between the antenna of the encoder and the antenna of the card can cause encoding to become less reliable. Because the drive mechanism of an encoder that positions the e-card tends to be in the way of optimal positioning of the antenna relative to an e-card automatically fed into the encoder, the encoding antenna cannot be placed in an optimal position.

Figure 1:
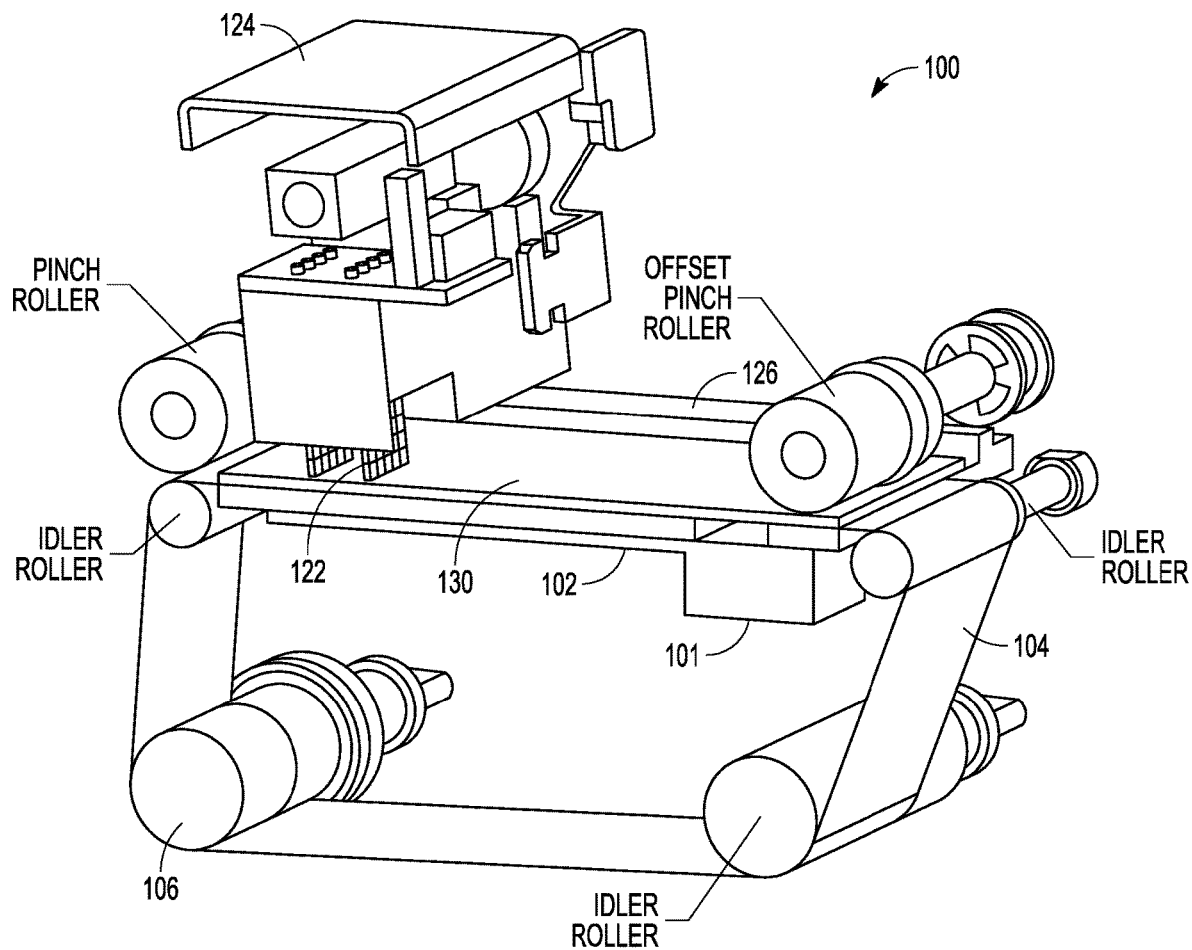
FIG. 1 is an illustration of an example of an e-card encoding system.

FIG. 1 is an illustration of an example of an e-card encoding system 100. The encoding system includes a contactless encoding module 101 that includes an encoding antenna 102 for contactless encoding of the cards. The contactless encoding module 101 can include encoding circuitry such as a microprocessor and memory, and circuitry for driving the RF encoding antenna.

The encoding system uses a belt drive to move the e-cards. Encodable cards are received onto the top surface of the belt 104 and a drive roller 106 is rotated by a belt drive controller to move the belt 104 to move the cards. The belt drive controller may include a position sensor to detect when an un-coded card is in position for encoding. In some examples, the position sensor is an optical sensor to detect when the card 130 is in the correct position for encoding.

The encoding system may include a card guide plate 126. The card guide plate includes a thin backing plate over which the belt moves. The backing plate supports the belt to prevent the belt from sagging when contact pins or pinch rollers engage the card. The backing plate is thin so that the encoding antenna 102 is as close as possible to the second side of the belt without the antenna contacting the belt for transferring an optimal signal to the card's antenna. The material of the backing plate is low friction to allow the belt to freely slide over the surface of the plate for low wear, minimized motor power requirement, and accuracy in positioning the cards. The material of the backing plate is non-conductive to avoid interfering with the signals sent using the encoding antenna 102 to encode the card. The guide plate 126 may include a guide edge on one or both sides of the belt 104. The guide edge or edges and backplate of the guide plate 126 may be a singular part that is molded or machined. The guide plate 126 may include support mounting points for the encoding antenna 102.

The belt 104 is looped to provide access for installation or maintenance of the encoding antenna 102. The encoding antenna 102 is positioned opposite the bottom surface of the belt 104 and under the position of the card 130. For an encoder that uses only rollers without belt drive to position the cards, the rollers get in the way of placing the encoding antenna in the best position to encode the cards. This is because the rollers would be spaced apart about the distance of one card or less. The belt drive approach in the example of FIG. 1 allows the rollers to be spaced apart to provide room for placing the encoding antenna closer to the card.

Figure 2:
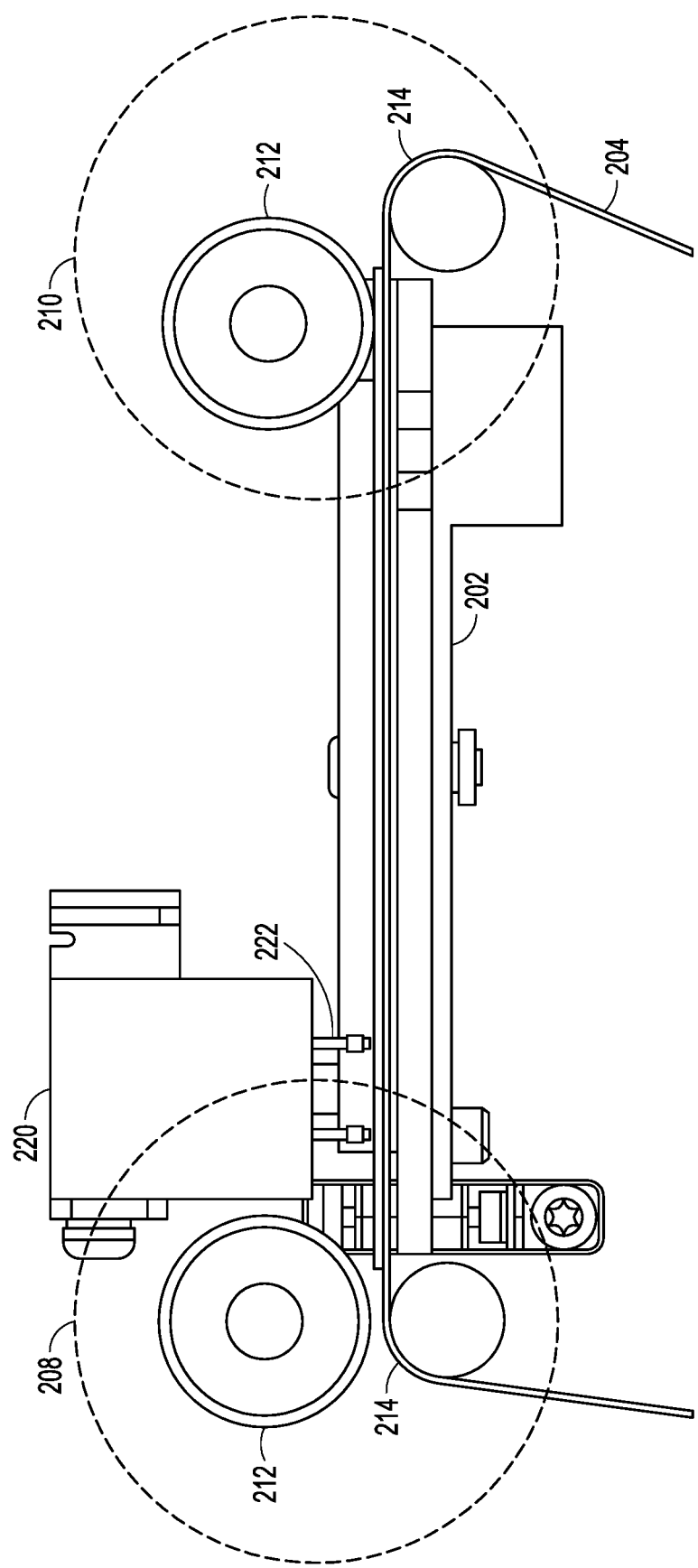
FIG. 2 is another illustration of the example e-card encoding system of FIG. 1

FIG. 2 is another illustrated view of the e-card encoding system 200 of FIG. 1. The encoding system includes a first roller pair 208 and a second roller pair 210. The belt 204 is placed between the rollers of each pair. Each pair of rollers includes a pinch roller 212 and an idler roller 214. For the second roller pair 210, the pinch roller 212 and the idler roller 214 are offset in position with respect to each other. In the first roller pair 208, the center axes of the two rollers are vertical to each other. The pinch roller 212 engages the belt at a nip point directly above the idler roller 214. In the second roller pair 210, the center axes of the rollers are offset to the side relative to each other instead of directly vertical as in the first roller pair 208. The nip point of the pinch roller 212 engages the belt at a position that is not above the center axis of the idler roller. Offsetting the pinch roller 212 and the idler roller 214 allows for more space between the idlers rollers of the roller pairs. This provides more space for optimal positioning of the encoding antenna 202 between the roller pairs and close to the card. The separation between the antenna and the card is on the order of ⅛ inch. This improves signal strength for encoding the cards.

Figure 3:
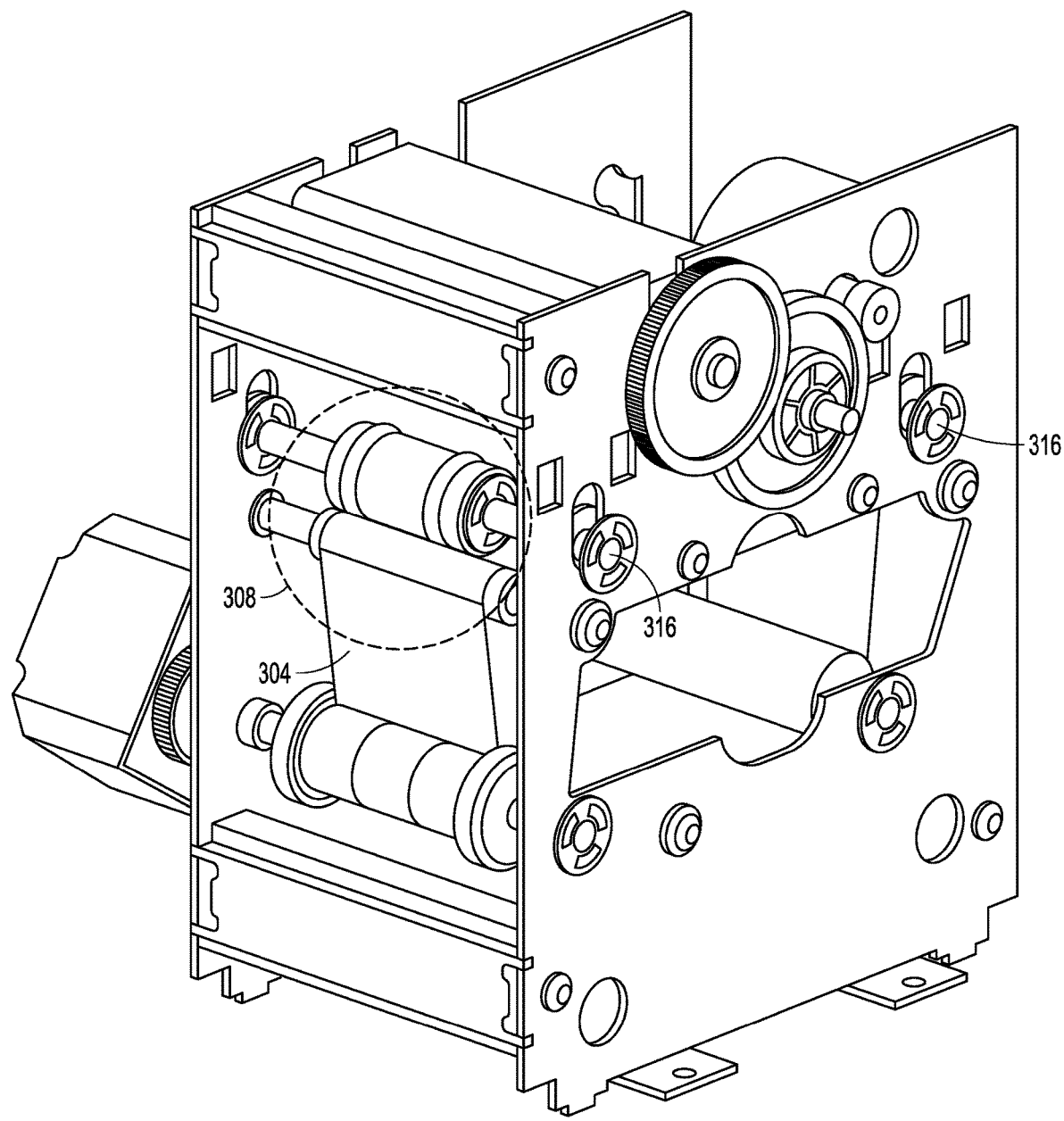
FIG. 3 is another illustrated view of an example of an e-card encoding system.

FIG. 3 is another illustrated view of an example of an e-card encoding system 300. The example of FIG. 3 shows the support structure for the e-card encoding system 300, the belt 304, and a roller pair 308. The belt drive controller moves the belt 304 to receive the encodeable card, position the card for encoding, and to dispense an encoded card. Preferably, the rollers of the roller pairs are low friction rollers. In some examples, the pinch rollers contacting the top surface of the belt and engaging the cards are bearing-hub rollers. A spring 316 applies force on the pinch roller (e.g., on the roller axle) in a direction toward the belt 304, and a card is pinched between the pinch roller and the belt 304.

Returning to FIG. 2, the e-card encoder system 200 includes a contact encoding module 220. In various examples, the e-card encoding system 200 can include one or both of the contactless encoding module and the contact encoding module 220. If the e-card encoding system 200 includes both a contactless encoding module and a contact encoding module, the e-card can be encoded simultaneously at the same position using the contactless encoding module and the contact encoding module, or the encoding can be performed using one of the modules at a time. Simultaneous encoding provides the advantage of a shorter encoding time. The contactless encoding module and the contact encoding module may provide different information for storing on the card or provide redundant information for the encoding. The contactless encoding module and the contact encoding module may include separate encoding circuitry or encoding circuitry may be common to both the contactless encoding module and the contact encoding module.

The contact encoding module 220 includes contact pins 222 to contact the card positioned by the belt drive controller for encoding. The contact pins 222 may be contact spring pins such as spring loaded pogo pins. The contact pins 222 are included in a contact pin assembly that holds the contact pins. As noted previously herein, an approach that slides the cards under the contact pins can cause the contact pins to wear out due to friction.

Returning to FIG. 1, the e-card encoding system 100 includes a lift mechanism 124. The lift mechanism 124 engages and disengages the contact pin assembly to move the contact pins in a direction orthogonal to the top surface of the belt 104. The lift mechanism 124 lowers the contact pins 122 onto the card when the card is parked in the encoding position and raises the contact pins 122 to dispense an encoded card and to receive the next un-encoded card. The up and down motion of the contact pins 122 improves long-term reliability of the encoding system. The lift mechanism 124 may include one or more of a cam, a rack and pinion assembly, and a solenoid to engage and disengage the contact pin assembly.

Figure 4:
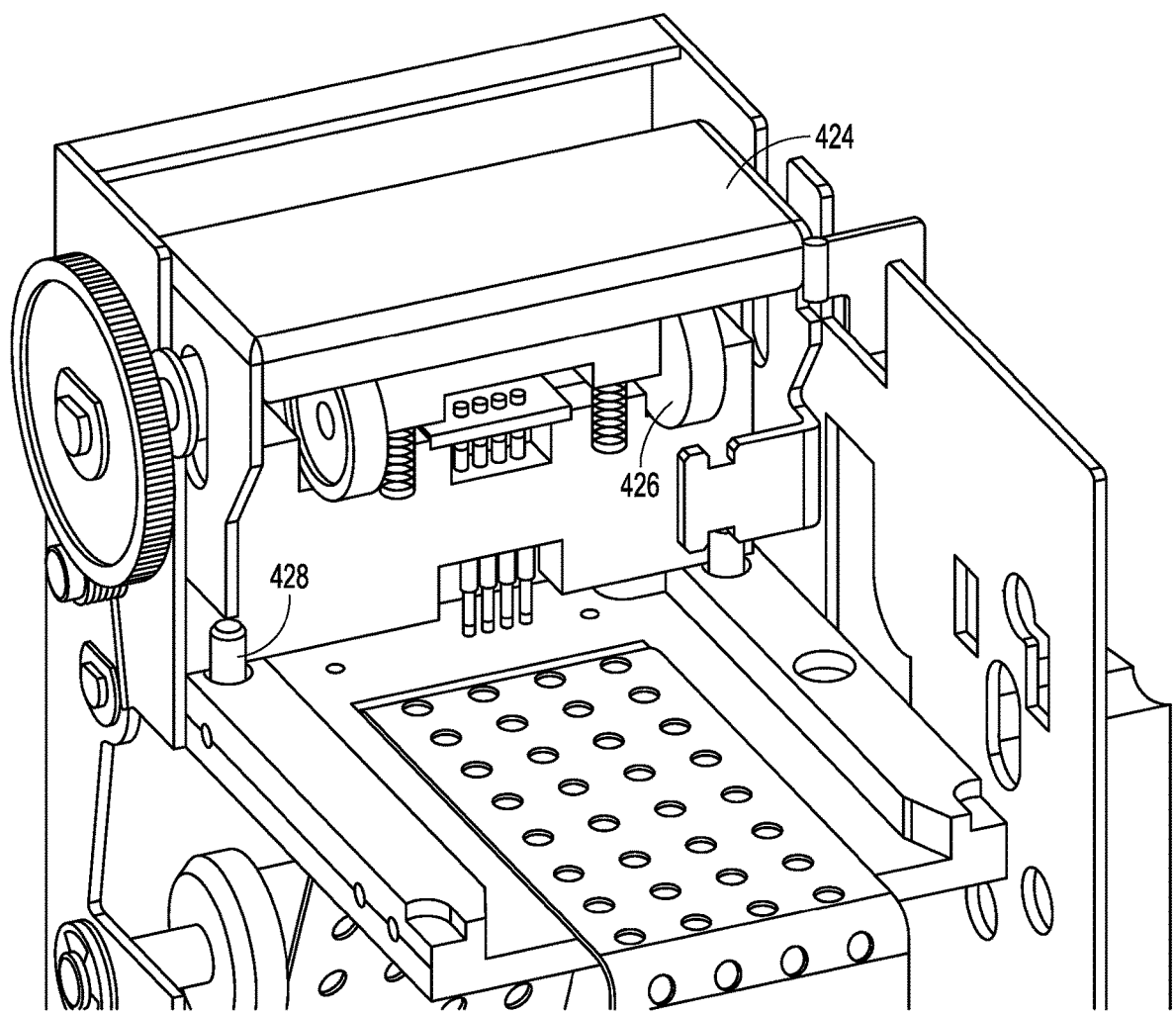
FIG. 4 is an illustration of an example of a lift mechanism for a contact pin assembly of a contact encoding module.

FIG. 4 is an illustration of an example of a lift mechanism 424 for a contact pin assembly of a contact encoding module. The lift mechanism includes a cam 426 that lifts the contact pin assembly after a card is encoded and lowers the contact pin assembly when the next card is parked for encoding. The contact pin assembly can include guide pins 428 to maintain proper alignment despite the up and down motion provided by the cam. The guide pins are inserted into openings of the assembly and the guide pins remain in the openings during the up and down motion to maintain alignment.

In some examples, the contact pins include a contact portion that contacts the card and a mounting portion that holds the contact pins in the assembly. The contact portion can be separable from the mounting portion to allow replacement of the contact portion of the pins in the event of wear.

Figure 5:
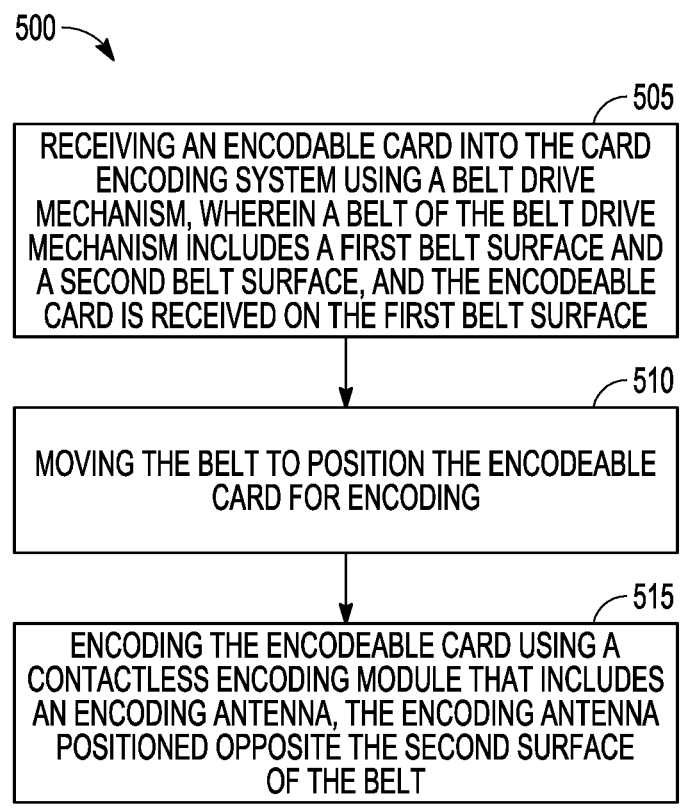
FIG. 5 is a flow diagram of an example of a method of operating an e-card encoding system.

FIG. 5 is a flow diagram of an example of a method 500 operating an e-card encoding system, such as any of the card encoding systems in the examples of FIGS. 1-3. At 505, an encodeable card is received into the card encoding system using a belt drive mechanism. The card is received on the top surface of the belt and at 510 the belt is moved by a belt drive controller to move the card into position for encoding. At 515, the card is encoded using a contactless encoding module. The contactless encoding module includes an RF encoding antenna. The position of the rollers for the belt provides space for the encoding antenna to be positioned close to the bottom surface of the belt and the card on the top surface of the belt. This allows the encoding antenna to be placed as close to the card as possible.

The method 500 can also include programming the card using a contact encoding module. The contact encoding module can include contact pins that are moved to contact the card when the card is in position for encoding, and then moved back to the original position after the encoding. The encoded card is moved away from the encoding module or modules and the next un-encoded card is moved into position. The contact pins are then moved back onto the un-encoded card and the process is repeated. The cards can be simultaneously encoded using the contactless encoding and the contact encoding.

The methods systems and devices described herein allow for close proximity of the encoding RF antenna to the card antenna because the two antennas are mainly separated by the belt and a guide plate. This placement of the encoding RF antenna to the card improves encoding reliability. The spring contact pin design reduces the wear of contact pins caused by approaches that slide the card under the pins.

Additional Disclosure and Examples

Example 1 can include subject matter (such as a card encoding system) comprising a belt to receive an encodable card on a first surface of the belt, a contactless encoding module including an encoding antenna, wherein the encoding antenna is positioned opposite a second surface of the belt, and a belt drive controller configured to rotate a drive roller to move the belt to position the encodable card for encoding using the encoding antenna.

In Example 2, the subject matter of Example 1 optionally includes a first roller pair and a second roller pair, and the belt is positioned between rollers of each of the first and second roller pairs. A roller of at least one of the first and second roller pairs is offset in position from the other roller of the roller pair, and the encoding antenna is positioned opposite the second surface of the belt and between the first and second roller pairs.

In Example 3, the subject matter of Example 2 includes first and second roller pairs that include a pinch roller and an idler roller, and the pinch roller of the first and second roller pairs is a bearing-hub roller.

In Example 4, the subject matter of Example 3 optionally includes a first spring and a second spring to respectively apply force on the pinch roller of the first roller pair and the pinch roller of the second roller pair in a direction toward the belt.

In Example 5, the subject matter of one or any combination of Examples 1-4 optionally includes a contact encoding module including multiple contact pins to contact the encodeable card for encoding, and a lift mechanism configured to move the contact pins in a direction orthogonal to the first surface of the belt and lower the contact pins onto the encodeable card when the encodeable card is in position for encoding.

In Example 6, the subject matter of Example 5 optionally includes a contact pin assembly including guide pins and the contact pins. The lift mechanism engages and disengages the contact pin assembly to move the contact pin assembly relative to the belt.

In Example 7, the subject matter of one or both of Examples 5 and 6 optionally includes contact pins that are contact spring pins that include a contact portion and a mounting portion, and the contact portion is separable from the mounting portion.

In Example 8, the subject matter of one or any combination of Examples 1-7 optionally includes a belt drive controller that includes a position sensor to detect that an encodable card is in position for encoding.

Example 9 can include subject matter (such as a method of operating a card encoding system) or can optionally be combined with one or any combination of Examples 1-8 to include such subject matter, comprising receiving an encodable card into the card encoding system using a belt drive mechanism, wherein a belt of the belt drive mechanism includes a first belt surface and a second belt surface, and the encodeable card is received on the first belt surface; moving the belt to position the encodeable card for encoding; and encoding the encodeable card using a contactless encoding module that includes an encoding antenna, the encoding antenna positioned opposite the second surface of the belt.

In Example 10, the subject matter of Example 9 optionally includes moving the belt between a first roller pair and a second roller pair; and encoding the encodeable card using the encoding antenna positioned opposite the second surface of the belt and between the first roller pair and the second roller pair.

In Example 11, the subject matter of Example 10 optionally includes encoding the encodeable card using the encoding antenna positioned between an idler roller of the first roller pair and an idler roller of the second roller pair.

In Example 12, the subject matter of one or both of Examples 10 and 11 optionally includes applying a spring force toward the belt on a pinch roller of the first roller pair and a pinch roller of the second roller pair.

In Example 13, the subject matter of one or any combination of Examples 9-12 optionally includes encoding the encodeable card using a contact encoding module that includes multiple contact pins.

In Example 14, the subject matter of Example 13 optionally includes encoding the encodeable card at a same position using both the contactless encoding module and the contact encoding module.

In Example 15, the subject matter of one or any combination of Examples 9-14 optionally includes moving the belt using a belt drive controller; and detecting the position of the encodeable card for encoding using a position sensor.

Example 16 can include subject matter (such as a card encoding system) or can optionally be combined with one or any combination of Examples 1-15 to include such subject matter comprising a belt to receive an encodable card on a first surface of the belt; a contact encoding module including multiple contact pins to contact the encodeable card for encoding; a belt drive controller configured to rotate a drive roller to move the belt to position the encodable card for encoding using the multiple contact pins; and a lift mechanism configured to move the contact pins in a direction orthogonal to the first surface of the belt and lower the contact pins onto the encodeable card when the encodeable card is in position for encoding.

In Example 17, the subject matter of Example 16 optionally includes a contact pin assembly including guide pins and the contact pins; and a the lift mechanism that engages and disengages the contact pin assembly to move the contact pin assembly relative to the belt.

In Example 18, the subject matter of Example 17 optionally includes contact pins that are contact spring pins that include a contact portion and a mounting portion, and the contact portion is separable from the mounting portion.

In Example 19, the subject matter of one or both of Examples 16 and 17 optionally includes a first roller pair and a second roller pair and the belt is positioned between rollers of each of the first and second roller pairs, wherein each of the first and second roller pair includes a pinch roller and an idler roller; a first spring and a second spring to apply force on the pinch rollers of the first and second roller pairs in a direction toward the belt; and the pinch roller of at least one of the first and second roller pairs is a bearing-hub idler roller.

In Example 20, the subject matter of one or any combination of Examples 16-19 optionally includes a belt drive controller that includes a position sensor to indicate that an encodable card is in position for encoding.

The above detailed description is intended to be illustrative, and not restrictive. For example, the above-described Examples (or one or more aspects thereof) may be used in combination with each other in any permutation. The detailed description includes references to the accompanying drawings, which form a part of the detailed description. The drawings show, by way of illustration, specific embodiments in which the invention can be practiced. Other embodiments can be used, such as by one of ordinary skill in the art upon reviewing the above description. In the event of inconsistent usages between this document and any publications, patents, and patent documents referred to in this document, the usage in the incorporated reference(s) should be considered supplementary to that of this document; for irreconcilable inconsistencies, the usage in this document controls. The Abstract is provided to allow the reader to quickly ascertain the nature of the technical disclosure. It is submitted with the understanding that it will not be used to interpret or limit the scope or meaning of the claims. In the detailed description, various features may be grouped together to streamline the disclosure. This should not be interpreted as intending that an unclaimed disclosed feature is essential to any claim. Rather, the subject matter may lie in less than all features of a particular disclosed embodiment. Thus, the following claims are hereby incorporated into the description, with each claim standing on its own as a separate embodiment, and it is contemplated that such embodiments can be combined with each other in various combinations or permutations. The scope should be determined with reference to the appended claims, along with the full scope of equivalents to which such claims are entitled.

What is claimed is:

1. A card encoding system, the system comprising:
   a belt to receive an encodable card on a first surface of the belt
   a contactless encoding module including an encoding antenna, wherein the encoding antenna is positioned opposite a second surface of the belt
   a belt drive controller configured to rotate a drive roller to move the belt to position the encodable card for encoding using the encoding antenna; and
   a first roller pair and a second roller pair, wherein each of the first and second roller pairs includes a pinch roller and an idler roller, the pinch roller of the first and second roller pairs is a bearing-hub roller, the belt is positioned between the pinch roller and the idler roller of the first and second roller pairs, and the encoding antenna is positioned opposite the second surface of the belt and between the first and second roller pairs.

2. The system of claim 1, wherein the pinch roller and the idler roller of at least one of the first and second roller pairs are offset in position.

3. The system of claim 1, including a first spring and a second spring to respectively apply force on the pinch roller of the first roller pair and the pinch roller of the second roller pair in a direction toward the belt.

4. The system of claim 1, including:
a contact encoding module including multiple contact pins to contact the encodeable card for encoding; and
a lift mechanism configured to move the contact pins in a direction orthogonal to the first surface of the belt and lower the contact pins onto the encodeable card when the encodeable card is in position for encoding.

5. The system of claim 4, including:
a contact pin assembly including guide pins and the contact pins; and
wherein the lift mechanism engages and disengages the contact pin assembly to move the contact pin assembly relative to the belt.

6. The system of claim 4, wherein the contact pins are contact spring pins that include a contact portion and a mounting portion, and the contact portion is separable from the mounting portion.

7. The system of claim 1, wherein the belt drive controller includes a position sensor to detect that an encodable card is in position for encoding.

8. A method of operating a card encoding system, the method comprising:
receiving an encodable card into the card encoding system using a belt drive mechanism, wherein a belt of the belt drive mechanism includes a first belt surface and a second belt surface, and the encodeable card is received on the first belt surface;
moving the belt between a first roller pair and a second roller pair to position the encodeable card for encoding; and
encoding the encodeable card using a contactless encoding module that includes an encoding antenna, the encoding antenna positioned opposite the second surface of the belt and between an idler roller of the first roller pair and an idler roller of the second roller pair.

9. The method of claim 8, including applying a spring force toward the belt on a pinch roller of the first roller pair and a pinch roller of the second roller pair.

10. The method of claim 8, wherein encoding the encodeable card includes encoding the encodeable card using a contact encoding module that includes multiple contact pins.

11. The method of claim 10, including encoding the encodeable card at a same position using both the contactless encoding module and the contact encoding module.

12. The method of claim 8, wherein positioning the encodeable card includes:
moving the belt using a belt drive controller; and
detecting the position of the encodeable card for encoding using a position sensor.

13. A card encoding system, the system comprising:
a belt to receive an encodable card on a first surface of the belt;
a contact encoding module including multiple contact pins to contact the encodeable card for encoding;
a belt drive controller configured to rotate a drive roller to move the belt to position the encodable card for encoding using the multiple contact pins; and
a lift mechanism configured to move the contact pins in a direction orthogonal to the first surface of the belt and lower the contact pins onto the encodeable card when the encodeable card is in position for encoding.

14. The card encoding system of claim 13, including:
a contact pin assembly including guide pins and the contact pins; and
wherein the lift mechanism engages and disengages the contact pin assembly to move the contact pin assembly relative to the belt.

15. The card encoding system of claim 14, wherein the contact pins are contact spring pins that include a contact portion and a mounting portion, and the contact portion is separable from the mounting portion.

16. The card encoding system of claim 13, including:
a first roller pair and a second roller pair and the belt is positioned between rollers of each of the first and second roller pairs, wherein each of the first and second roller pair includes a pinch roller and an idler roller;
a first spring and a second spring to apply force on the pinch rollers of the first and second roller pairs in a direction toward the belt; and
wherein the pinch roller of at least one of the first and second roller pairs is a bearing-hub idler roller.

17. The card encoding system of claim 13, wherein the belt drive controller includes a position sensor to indicate that an encodable card is in position for encoding.

\* \* \* \* \*